United States Patent [19]

Vora et al.

[11] Patent Number: 5,025,089
[45] Date of Patent: Jun. 18, 1991

[54] COPOLYIMIDES DERIVED FROM 2,2-BIS (AMINO PHENYL) HEXAFLUOROPROPANE

[75] Inventors: Rohitkumar H. Vora, Westfield; Paul N. Chen, Sr., Gillette, both of N.J.

[73] Assignee: Hoechst Celanese Corp., Somerville, N.J.

[21] Appl. No.: 434,148

[22] Filed: Nov. 13, 1989

Related U.S. Application Data

[63] Continuation-in-part of Ser. No. 217,928, Jul. 12, 1988, Pat. No. 4,978,737.

[51] Int. Cl.$^5$ .............................................. C08G 69/26
[52] U.S. Cl. ..................................... 528/353; 528/125; 528/126; 528/128; 528/172; 528/179; 528/182; 528/183; 528/185; 528/190; 528/191; 528/351; 528/352; 524/105; 524/108; 524/233; 524/356; 526/266; 264/331.19
[58] Field of Search ............... 528/353, 125, 126, 128, 528/172, 179, 182, 183, 185, 190, 191, 351, 352; 524/105, 108, 233, 356; 526/266; 264/331.19

[56] References Cited

U.S. PATENT DOCUMENTS 3,356,648  12/1967  Rogers .............................. 528/353
3,424,718  1/1969   Angelo ............................... 528/28
4,886,874  12/1989  Nagano et al. ................... 528/353

Primary Examiner—John Kight, III
Assistant Examiner—Sam A. Acquah
Attorney, Agent, or Firm—Perman & Green

[57] ABSTRACT

Copolyimides derived from the reaction product of 3,3'-6 F diamine or 4,4'-6 F diamine, at least one other diamine, and pyromellitic dianhydride can be rendered solvent soluble while at the same time exhibiting an improvement in both mechanical and electrical properties by the inclusion of at least one other dianhydride having a diaryl nucleus in the reaction media. Suitable such dianhydrides include bis (3,4 dicarboxy phenyl) ether dianhydride, 3,3'4,4' benzophenone tetracarboxylic dianhydride, 3,3',4,4' diphenyl tetracarboxylic acid dianhydride and 2,2 bis(3,4 dicarboxyphenyl) hexafluoropropane dianhydride (6F-DA). Such polyimides are soluble in common organic solvents such as methyl ethyl ketone or N-methyl pyrrolidone, and exhibit excellent film forming properties with improved mechanical and electrical properties as compared to the corresponding homopolyimides. They possess excellent heat stability (Tg's in excess of about 350° C.) and have superior electrical properties, for example, dielectric constant of less than about 2.5 at 10 megahertz.

17 Claims, No Drawings

COPOLYIMIDES DERIVED FROM 2,2-BIS (AMINO PHENYL) HEXAFLUOROPROPANE

This application is a Continuation-in-part of copending application Ser. No. 07/217,928, filed on July 12, 1988.

BACKGROUND OF THE INVENTION

The present invention relates to polyimide polymers having superior electrical and mechanical properties which are the imidized condensation product of 2,2-bis (3-amino-phenyl)hexafluoropropane, (referred to as (3,3'-6F diamine) or 2,2-bis(4-amino-phenyl)hexafluoro propane (referred to as 4,4'-6 F diamine) and at least one other diamine, with pyromellitic dianhydride and one or more additional aromatic dianhydrides, and to articles prepared therefrom.

Polyimide condensation products of 4,4'-6 F diamine and aromatic dianhydrides are known in the art and described in U.S. Pat. No. 3,356,648. These polyimides are produced by first and dianhydride, such as pyromellitic dianhydride and 4,4'-6 F diamine, in suitable solvent, followed by conversion of the polyamic acid to the polyimide. Imidization is preferably carried out by the application of a solution of the polyamic acid to a substrate, by the evaporation of the solvent and by heating the resultant film to temperatures in the order of 270 to 300° C. for about 2 hours. These polyimides possess excellent heat stability, good electrical properties and high tensile strength.

U.S. Pat. No. 4,592,925 discloses similar polyimides prepared by imidization of the polyamic condensation product of 3,3'-6F diamine with 4,4'-hexafluoro iso-propylidenebis(phthalic anhydride). These polyimides are disclosed to be particularly suitable as protective coatings for solar cells.

While polyimides based on the reaction product of pyromellitic dianhydride and 6F-diamine offer good heat stability, mechanical and electrical properties, these polyimides are generally insoluble in organic solvents such as N-methyl pyrrolidone (NMP), acetone and the like, and produce very brittle films. It has been suggested in the prior art the solubility in halogenated solvents of copolyetherimides based on the condensation product of 2,2-bis-[4,(2,3-dicarboxyphenoxy)phenyl] propane dianhydride and a diamine such as m-phenylene diamine can be enhanced by the inclusion of 2,2-bis(3,4 dicarboxyphenyl)hexafluoropropane dianhydride in the reaction mixture to form a copolyetherimide. In addition, U.S. Pat. No. 3,424,718 teaches that the adhesive qualities of polyimide polymers are enhanced by including a mixture of aromatic and aryl aliphatic diamines in the reaction mixture. In one example, the polyimide is prepared by reacting two different dianhydrides, namely pyromellitic and 2,2-bis(3,4 dicarboxyphenyl)hexafluoropropane and two different diamines, namely m-xylene diamine and bis(4-aminophenyl) ether.

While it is desirable to impart solvent solubility to solvent insoluble polyimides to render them useful in applications where the polyimide is applied to a substrate in the form of a solution, or in the formation of composites, it is also desirable that the mechanical and insulating properties of such polyimides not be compromised.

SUMMARY OF THE INVENTION

It has now been discovered that copolyimides derived from the reaction product of 3,3'-6 F diamine or 4,4'-6 F diamine, at least one other diamine, and pyromellitic dianhydride (PMDA) can be rendered solvent soluble while at the same time exhibiting an improvement in both mechanical and electrical properties by the inclusion of at least one other dianhydride having a diaryl nucleus in the reaction media. Suitable such dianhydrides include bis (3,4 dicarboxy phenyl) ether dianhydride (ODPA), 3,3'4,4' benzophenone tetracarboxylic dianhydride (BTDA), 3,3',4,4' diphenyl tetracarboxylic acid dianhydride (BPDA) and 2,2 bis(3,4 dicarboxyphenyl) hexafluoropropane dianhydride (6F-DA). Such polyimides are soluble in common organic solvents such as methyl ethyl ketone or N-methyl pyrrolidone, and exhibit excellent film forming properties with improved mechanical and electrical properties as compared to the corresponding homopolyimides. They possess excellent heat stability (Tg's in excess of about 350° C.) and have superior electrical properties, for example, dielectric constant of less than about 2.5 at 10 megahertz.

DETAILED DESCRIPTION OF THE INVENTION

A preferred process for preparing the polyimides of this invention involves first preparing a polyamide-acid by reacting the mixed diamines and the mixed dianhydrides in an organic solvent, preferably under substantially anhydrous conditions for a time and at a temperature sufficient to provide the corresponding polyamide-acid (polyamic acid), and then converting the polyamide-acid to the polyimide. Suitable conditions for reacting the diamine and the dianhydride are disclosed in detail in U.S. Pat. Nos. 3,356,648 and 3,959,350, both to Rogers, which are incorporated herein by reference.

In a preferred process for preparing the polyimides, the mixed diamines and the mixed dianhydrides are reacted in a suitable solvent such as N methyl pyrrolidone (NMP), gamma-butyrolactone (BLO), or a mixture of BLO and another solvent such as diglyme. The resulting product is a polyamide-acid which is then converted to the desired polyimide by one of several methods; heating the polyamide-acid solution until imidization is substantially complete; or by combining the polyamide-acid solution and a dehydrating agent, with or without catalyst, and optionally heating the resulting mixture until imidization is substantially complete.

The mixed dianhydrides and the mixed diamines are reacted in approximately equimolar proportions. The relative proportion of the dianhydrides with respect to one another ranges from about 35 to about 75 mole percent PMDA and correspondingly from about 25 to about 65 mole percent of the codianhydride (ODPA, BTDA, BPDA or 6F-DA). The preferred ratio of the dianhydride is about 50 mole percent of each of the codianhydrides.

The 3,3'-6F diamine and 4,4'-6F diamine reactants may also be used in admixture with one or more other non-6F-aromatic diamines in preparing the copolyimides of the present invention at levels of up to about 75 mole percent of non-6F-aromatic diamine based on the total diamine present. The limit of addition of said additional non-6F-diamine is determined by solubility factors in that the resulting copolyimide must contain sufficient fluoro substituent groups to remain soluble in organic solvent. Suitable such diamines are materials responding to the general formula H₂N—R—NH₂ wherein R is a divalent organic radical. Preferably R comprises an aromatic moiety such as a phenylene, naphthalene or bis-phenylene-type group.

Where such diamine mixtures are employed, the molar ratio of 6F-Diamine and said one or more other diamines is preferably within the range of about 3 to 1 to about 1 to 3 based on the total moles of diamine present. Equimolar ratios of 6F and non-6F Diamines are preferred.

Illustrative of diamines which are suitable for use in mixtures with 6F Diamine are:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl)sulfone;
bis(4-aminophenyl) sulfone;
4,4'-diamino-dibenzyl sulfoxide;
3,4'-oxydianiline
2-(3-aminophenyl)-2-(4-aminophenyl) hexafluoropropane
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
2,2'-bis(3-aminophenoxyphenyl)propane;
2,2'-bis(3-aminophenoxyphenyl)sulfone;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
3,3'-diamino-1,1,1'-diadamantane;
N-(3-aminophenyl)-4-aminobenzamide;
4-aminophenyl-3-aminobenzoate;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,5-bis(3-aminophenyl) decafluoropentane; and mixtures thereof.

The most preferred diamines used to prepare mixtures with 6F-diamines are selected from the group consisting of m-phenylene diamine, p-phenylene diamine and diamines having the structure:

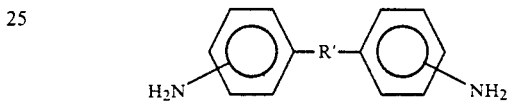

wherein R', is selected from the group consisting of C₁ to C₄ alkylene such as methylene, ethylene, propylene, and isopropylene; a covalent carbon to carbon bond; 1-phenyl-2,2,2-trifluoroethylidene; dichloro and difluoroalkylenes up to 3 carbons; oxy; thio; sulfinyl; sulfonyl; sulfonamido; carbonyl; oxydicarbonyl; oxydimethylene; sulfonyldioxy; carbonyldioxy; disilanylene; polysilanylene having up to 8 Si atoms; disiloxanylene; and a polysiloxanylene up to 8 Si atoms. Preferably, the linking group R' is selected from oxy, carbonyl, methylene, a covalent carbon to carbon bond, and sulfonyl.

The most preferred diamines are those free of fluorine such as bis (4-amino-phenyl) ether (oxydianiline), bis (4-amino-phenyl) methane and bis (4-aminophenyl) sulfone.

The following examples are illustrative of the invention.

EXAMPLE 1

The polyimide condensation product of 2,2-bis(4-aminophenyl)hexafluoropropane-(4,4'-6F diamine) and equimolar quantities of a mixture of pyromellitic dianhydride (PMDA) and 3,3',4,4' diphenyl tetracarboxylic acid dianhydride (BPDA) was prepared as follows:

A 250 ml., 3-neck flask equipped with a condenser, thermometer and stirrer was charged with 16.7 grams (0.05 moles) of 30 electronic grade 4,4'-6 F diamine and 50 grams of NMP solvent under nitrogen atmosphere. The mixture was agitated at room temperature to obtain a clear solution and to this solution was gradually added a mixture of 5.28 grams (0.025 mole) of electronic grade PMDA and 7.39 grams (0.025 mole) of electronic grade BPDA. After adding an additional 116 grams of solvent the reaction mixture was stirred overnight at room temperature. The resulting viscous polyamic acid solution had an inherent viscosity of 1.05 dl/gram as measured at 0.5 gm/dl in dimethyl acetamide at 25° C. To 73 grams of the polyamic acid solution was added 23.5 grams of acetic anhydride and 2.3 grams of beta-picoline to chemically convert the polyamic acid to the polyimide. The resulting polyimide is precipitated in methanol and is isolated by filtration, washed with fresh methanol and dried. The polymer had an inherent viscosity 0.71 dl/gm.

The polymer is soluble in solvents such as n-methyl pyrrolidone, acetone, methyl ethyl ketone, dimethylacetamide, diglyme, tetrahydrofuran, chloroform, butyrolactone, chloroform and dimethyl-formamide. A film having a thickness of 2 mil is prepared by forming a draw down of a 20% solution of the polymer in a butryolactone/diglyme mixture. The film is then heated to 350° C. in stepwise heating to evaporate off the solvent.

6F-DA. The polymer had an inherent viscosity of 0.7 dl/gm.

Films of each of the polyimides of Examples 2-4 having a thickness in the range of about 2 to 3 mils were prepared and dried as set forth in Example 1. Five control polyimide polymers were also prepared according to the procedure of Example 1. These consisted of the homopolyimide prepared by imidizing the condensation product of 4,4'-6F diamine and BPDA, BTDA, ODPA, 6FDA and PMDA, respectively. The polymers had inherent viscosities of 1.0, 0.73, 1.1, and 0.9 respectively. Films of these four polymers were prepared and dried as set forth in Example 1. The inherent viscosity of the PMDA polymer was not determined.

TABLE 1

| Film | Mole % Dianhydride 50% | | Mole % Diamine 50% | DSC Tg °C. | TGA 5% Weight Loss at °C. | Mechanical Properties by Instrone | | | Wt Loss*[1] at 340° C. after 235 hours % | Film Characteristics |
|---|---|---|---|---|---|---|---|---|---|---|
| | | | | | | Elongation % | Stress Break psi | at Young's Modulus Ksi | | |
| Control A | BPDA (100%) | — | 6F-DA 100% | 355 | 540 | 22 | 18,000 | 390 | 3.2 | Soluble Clear Yellow Tone |
| Control B | BTDA (100%) | — | 6F-DA 100% | 307 | 535 | 10 | 15,000 | 380 | 3.4 | Soluble Clear Amber |
| Control C | ODPA (100%) | — | 6F-DA 100% | 307 | 540 | 10 | 14,300 | 294 | 3.4 | Soluble Almost Colorless |
| Control D | 6FDA (100%) | — | 6F-DA 100% | 320 | 530 | 8 | 15,000 | 400 | 4.2 | Soluble Colorless |
| Control E | PMSA (100%) | — | 6F-DA 100% | 405 | 510 | — | — | — | — | Insoluble Brittle Film |
| Example 1 | BPDA | PMDA | 6F-DA 100% | 386 | 530 | 20 | 14,000 | 290 | 1.8 | Soluble Pale Yellow |
| Example 2 | BTDA | PMDA | 6F-DA 100% | 364 | 530 | 21 | 14,000 | 271 | 2.2 | Soluble Pale Yellow |
| Example 3 | ODPA | PMDA | 6F-DA 100% | 350 | 525 | 12 | 12,500 | 252 | 2.4 | Soluble Pale Yellow Clear |
| Example 4 | 6FDA | PMDA | 6F-DA 100% | 362 | 515 | 5 | 10,200 | 324 | 3.0 | Soluble Pale Yellow Clear |

*[1]Solid Powder;
— Not Tested

EXAMPLE 2

The procedure of Example 1 was employed to prepare the copolyimide of 4,4' 6F-diamine and equimolar quantities of PMDA and 3,3'4,4' benzophenone tetracarboxylic dianhydride (BTDA). The reaction medium comprised 66.8 grams (0.2 mole) of electronic grade 4,4'-6 F diamine, 21.97 g (0.1 mole) of electronic grade PMDA and 32.71 g (0.1 mole) of electronic grade BTDA. The resulting polymer had an inherent viscosity of 1.02 dl/gm.

EXAMPLE 3

The procedure of Example 1 was repeated to prepare a copolyimide of 4,4'-6 F diamine and equimolar quantities of PMDA and bis (3,4 dicarboxy phenyl) ether dianhydride (ODPA). The reaction medium comprised 66.8 g (0.2 moles) of electronic grade 4,4'-6 F diamine, 31.06 g (0.1) moles of electronic grade ODPA and 21.97 g (0.1 moles) of electronic grade PMDA. The resulting polymer had an inherent viscosity of 0.7 dl/gm.

EXAMPLE 4

The procedure of Example 1 was repeated to prepare a copolyimide of 4,4'- 6F-diamine, and equimolar quantities of PMDA and 2,2 bis (3,4 dicarboxyphenyl) hexafluoropropane dianhydride (6F -DA). The reaction medium comprised 66.8 g (0.2 mole) of electronic grade 4,4'-6 F diamine, 21.97 g (0.1 mole) of electronic grade PMDA and 44.4 g (0.1 mole) of 4,4'-electronic grade The thermal and mechanical properties of these films were evaluated. Results are shown in Table 1.

As can be seen from this data, the copolyimides of this invention in all cases exhibited a higher glass transition temperature than its homopolyimide counterpart (as measured by differential scanning calorimetry (DSC). Compare Example 1 (386° C.) with the BPDA control (355° C.); Example 2 (364° C.) with the BTDA control (307° C.); Example 3 (350° C.) with the ODPA control (307° C.); and Example 4 (362° C.) with the 6FDA control (320° C.). In addition, the copolyimides of this invention are more heat stable than their homopolyimide counterparts as can be shown by a comparison of the weight loss at 343° C. after 235 hours in the last column of Table 1. This improvement is afforded with little compromise of other properties of the polymers as shown by the other data in Table 1.

In addition, films prepared from the PMDA and the codianhydride reactant of Examples 1-4 all produced clear flexible films soluble in N-methyl pyrrolidone and exhibiting only a pale yellow color.

This is to be contrasted with the control E homopolyimide of PMDA which was brittle and insoluble in N-methyl pyrrolidone.

The glass transition temperatures (Tg °C.) in accordance with Table 1 were determined using a Perkin Elmer DSC-4 calorimeter at 20° C. per minute, nitrogen atmosphere at 60 cc per minute. Glass transition using this method is generally defined at the point of intersection of tangent lines about the point of first inflection of the heating curve of the polymer. Thermo gravametric analysis (TGA-5% weight loss—°C.) was performed using a Perkin Elmer 65-2 analyzer at 20° C. per minute at an air rate of 80 cc per minute. The mechanical properties were evaluated using film strips ½ inch wide on an Instron ® 4202 machine in accordance with ASTM D-882-81.

The electrical properties of polyimide films prepared according to this invention were evaluated and compared with the electrical properties of comparable films known in the prior art. Results are shown in Table 2. The film designated "33" is a homopolyimide based on the condensation product of 3,3' 6F-diamine and 6FDA; the film designated "44" is homopolyimide based on the condensation product of 4,4' 6F-diamine and 6FDA; the control is a homopolyimide of 4,4'6F-diamine and BPDA; the film designated Kapton (R) (trademark of the DuPont Corporation) is a homopolyimide of oxydianiline and PMDA.

EXAMPLE 5

The procedure of Example 1 was employed to prepare a copolyimide of equimolar quantities of 4,4' 6F-diamine and bis (4-aminophenyl) ether (ODA) and equimolar quantities of PMDA and 2,2-bis (3,4 dicarboxyphenyl) hexafluoropropane dianhydride (6F-DA). The reaction medium comprised 10.02 g. (0.03 mole) of electronic grade 4,4'-6F diamine, 6.00 g (0.03 mole) of oxydianiline (ODA), 13.32g. (0.03 mole) of electronic grade 6F-DA, and 6.40 g (0.03 mole) of electronic grade PMDA. The polymer had an inherent viscosity of 0.59 dl/gm. in DMAC, a glass transition temperature (Tg°c) of 366° C., TGA 5% weight loss at 538° C., a weight average molecular weight of 47,321 a number average molecular weight of 24,862, a tensile strength of 10 Ksi, an elongation of 4% and a modulus of 370 Ksi.

As can be seen from the data of Table 2, the copolyimides of the present invention exhibit a generally lower dielectric constant and generally higher dielectric strength (with the exception of Kapton ®) than the counterpart polymers which were evaluated. Other electrical properties are also maintained or better than the counterpart polymers.

Polyimides of this invention may be molded using standard techniques such as compression molding or injection molding to produce melt fabricated articles such as safety masks, windshields, electronic circuit substrates, airplane windows or the like. They may be compounded with graphite, graphite fiber, molybdenum disulphide or PTFE for the production of self-lubricating wear surfaces useful for piston rings, valve seats, bearings and seals. They may also be compounded with fibers such as glass, graphite or boron fibers to produce molding compounds for high strength structural components such as jet engine components. The polyimides may also be compounded with friction materials to produce molding compounds for high temperature braking components or with abrasive materials such as diamonds for high speed grinding wheels.

The polyimides may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and photoresist coatings useful in microelectronic processing.

TABLE 2

| Film Thickness | Mole % Dianhydride | | Mole % Diamine | | Dielectric 1 Constant | | Di-electric 2 Strength | Dissipation 3 Factor | | Volume 4 Resistivity | Surface 5 Resistivity |
|---|---|---|---|---|---|---|---|---|---|---|---|
| | | | | | 1 MHz | 10 MHz | Volt/Mil | 1 MHz | 10 MHz | Ohm.Cm. | Ohm. |
| 33 (3 mil) | 6FDA 100% | — | 3,3'-6F-Diamine 100% | | 2.78 | 2.58 | 1933 | $6 \times 10^{-4}$ | $1.5 \times 10^{-3}$ | $1.97 \times 10^{16}$ | $3.14 \times 10^{14}$ |
| 44 (3 mil) | 6FDA 100% | — | 4,4'-6F-Diamine 100% | | 2.78 | 2.58 | 1500 | $4 \times 10^{-4}$ | $1.8 \times 10^{-3}$ | $1.92 \times 10^{16}$ | $3.14 \times 10^{14}$ |
| Control (3 mil) | BPDA 100% | — | 4,4'-6F-Diamine 100% | | 2.78 | 2.56 | 1900 | $7 \times 10^{-4}$ | $1.7 \times 10^{-3}$ | $2.12 \times 10^{16}$ | $2.99 \times 10^{14}$ |
| Ex. 1 (2 mil) | BPDA 50% | PMDA 50% | 4,4'-6F-Diamine 100% | | 2.56 | 2.33 | 2000 | $5 \times 10^{-4}$ | $1.6 \times 10^{-3}$ | $2.93 \times 10^{16}$ | $3.26 \times 10^{14}$ |
| Ex. 2 (2 mil) | BTDA 50% | PMDA 50% | 4,4'-6F-Diamine 100% | | 2.52 | 2.40 | 2300 | $3 \times 10^{-4}$ | $2.2 \times 10^{-3}$ | $2.76 \times 10^{16}$ | $3.14 \times 10^{14}$ |
| Ex. 4 (2.5 mil) | 6FDA 50% | PMDA 50% | 4,4'-6F-Diamine 100% | | 2.50 | 2.40 | 1960 | $3 \times 10^{-4}$ | $1.8 \times 10^{-3}$ | $1.49 \times 10^{16}$ | $3.13 \times 10^{14}$ |
| Ex. 5 (2.5 mil) | 6FDA 50% | PMDA 50% | 4,4'-6F-Diamine 50% | ODA 50% | 2.75 | 2.44 | 4080 | $7 \times 10^{-4}$ | $3.9 \times 10^{-3}$ | $1.94 \times 10^{16}$ | $2.97 \times 10^{14}$ |
| Kapton ® (1 mil) | | | | | 3.32 | 3.20 | 3900 | $9 \times 10^{-4}$ | $1.6 \times 10^{-3}$ | $1.66 \times 10^{16}$ | $3.22 \times 10^{14}$ |

FOOTNOTES:
1 - ASTM D-150-81
2 - ASTM D-149-81
3 - ASTM D-150-81
4 - ASTM D-257-78
5 - ASTM-D-257-78

The polyimides may also be used to produce high temperature adhesives for bonding aerospace structures or electrical circuitry, conductive adhesives when mixed with conductive fillers such as silver or gold for microelectronic applications, or adhesives for glass, metal or plastic substrates.

They may be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What we claim is:

1. A polyimide polymer soluble in N-methylpyrrolidone comprising the imidized condensation product of a mixture of diamines comprising:
   (a) a diamine selected from the group consisting of 2,2-bis(3-aminophenyl) hexafluouropropane and 2,2-bis(4-aminophenyl) hexafluoropropane;
   (b) a second diamine having the formula $H_2N$—$R$—$NH_2$ wherein R is a divalent aromatic radical comprising a phenylene, napthalene or bis-phenlene group; and a mixture of dianhydrides comprising:
   (c) pyromellitic dianhydride; and
   (d) at least one additional dianhydride selected from the groups consisting of bis (3,4-dicarboxyphenyl) ether dianhydride, 3,3', 4,4' benzophenone tetracarboxylic dianhydride, 3,3', 4,4' diphenyl tetracarboxylic acid dianhydride and 2,2 bis (3,4 dicarboxy phenyl) hexafluoropropane dianhydride, the relative proportions of said dianhydrides present in the mixture being from about 35 to about 75 mole percent of (c) and from about 25 to about 65 mole percent of (d), and the relative molar proportion of said diamine (a) and said diamine (b) being in the range of from about 3:1 to 1:3 respectively.

2. The polyimide of claim 1 having a glass transition temperature of at least about 350° C.

3. The polyimide of claim 1 having a weight loss at 343° C. after 235 hours of not greater than about 3.0 percent.

4. The polyimide of claim 1 wherein said mixture of dianhydrides are present at a ratio of about 50 mole percent of each.

5. The polyimide of claim 1 wherein said second diamine (b) has the formula:

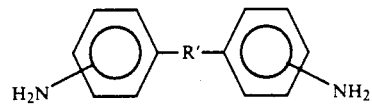

wherein R' is selected from the group consisting of a $C_1$ to $C_4$ alkylene group, such as methylene, ethylene, propylene, and isopropylene; a covalent carbon to carbon bond; 1-phenyl-2,2,2-trifluoroethylidene; dichloro and difluoroalkylenes up to 3 carbons; oxy; thio; sulfinyl; sulfonyl; sulfonamido; carbonyl; oxydi carbonyl; oxydimethylene; sulfonyldioxy; carbonyldioxy; disilanylene; polysilanylene having up to 8 Si atoms; disiloxanylene; and a polysiloxanylene up to 8 Si atoms.

6. The polyimide of claim 5 wherein R' is selected from the group consisting of oxy, carbonyl, methylene, a covalent carbon to carbon bond, and sulfonyl.

7. The polyimide of claim 6 wherein R' is oxy.

8. The polyimide of claim 1 wherein said mixture of diamines are present at a ratio of about 50 mole percent of each.

9. The polyimide of claim 1 wherein said diamine (a) is 2,2 bis (4-aminophenyl) hexafluoropropane.

10. The polyimide of claim 9 wherein said additional dianhydride is 2,2 bis (3,4 dicarboxyphenyl) hexafluoropropane dianhydride.

11. The polyimide of claim 10 wherein said mixture of dianhydrides are present at a ratio of about 50 mole percent of each.

12. The polyimide of claim 1 having a glass transition temperature of at least about 350° C.

13. The polyimide of claim 1 having a dielectric constant of less than about 2.5 at 10 megahertz.

14. A solution of the polyimide of claim 1 in organic solvent.

15. A film prepared by coating the solution of claim 14 on a suitable substrate, and evaporating off the solvent.

16. A fiber prepared from the copolyimide of claim 1.

17. A composite comprising the polyimide of claim 1 mixed with reinforcing fibers.

* * * * *